US008099452B2

(12) United States Patent
Chkodrov et al.

(10) Patent No.: US 8,099,452 B2
(45) Date of Patent: Jan. 17, 2012

(54) EVENT STREAM CONDITIONING

(75) Inventors: Gueorgui B Chkodrov, Redmond, WA (US); Roger S Barga, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1283 days.

(21) Appl. No.: 11/470,137

(22) Filed: Sep. 5, 2006

(65) Prior Publication Data

US 2008/0072221 A1     Mar. 20, 2008

(51) Int. Cl.
G06F 15/16 (2006.01)
(52) U.S. Cl. ......... 709/201; 709/202; 709/203; 709/208
(58) Field of Classification Search .................. 709/201
See application file for complete search history.

(56) References Cited

U.S. PATENT DOCUMENTS

| | | | |
|---|---|---|---|
| 5,838,909 A | 11/1998 | Roy et al. | |
| 5,905,874 A | 5/1999 | Johnson | |
| 6,101,533 A | 8/2000 | Brandt et al. | |
| 6,321,252 B1 * | 11/2001 | Bhola et al. | 709/204 |
| 6,356,288 B1 | 3/2002 | Freeman et al. | |
| 6,711,619 B1 | 3/2004 | Chandramohan et al. | |
| 6,748,451 B2 | 6/2004 | Woods et al. | |
| 6,831,921 B2 | 12/2004 | Higgins | |
| 6,987,728 B2 | 1/2006 | Deshpande | |
| 2003/0110206 A1 | 6/2003 | Osokine | |
| 2003/0110296 A1 | 6/2003 | Kirsch et al. | |
| 2003/0117899 A1 | 6/2003 | Edison | |
| 2005/0038850 A1 | 2/2005 | Oe et al. | |
| 2006/0036992 A1 | 2/2006 | Hayles et al. | |
| 2006/0041859 A1 | 2/2006 | Vrancic et al. | |
| 2006/0080401 A1 | 4/2006 | Gill et al. | |

OTHER PUBLICATIONS

International Search Report dated Dec. 26, 2007 for PCT Application Serial No. PCT/US2007/075291, 7 pages.
Goel et al., "Supporting Low Latency TCP-Based Media Streams", http://www.eecg.toronto.edu/~ashvin/publications/iwqos2002.pdf.
Jamrozik et al., "Reducing Network Latency Using Subpages in a Global Memory Environment", Date: Oct. 1996, http://www.cs.wisc.edu/~vernon/papers/gms.96asplos.pdf#search=%22reduce%20network%20latency%2Bpdf%22.
Koenig et al., "Using Message-Driven Objects to Mask Latency in Grid Computing Applications", http://charm.cs.uiuc.edu/papers/LatencyToleranceIPDPS05.pdf#search=%22mask%20latency%20in%20networks%2Bpdf%22.

* cited by examiner

Primary Examiner — John Follansbee
Assistant Examiner — Maceeh Anwari
(74) Attorney, Agent, or Firm — Lee & Hayes, PLLC

(57) ABSTRACT

A distributed event processing system that can organize (e.g., order) input streams regardless of actual time of receipt is provided. This order may simply be arrival order or given explicitly on a specific event attribute, such as a timestamp or sequence number. Traditional standing event queries, such as a temporal correlation of events across multiple streams, often block if an input stream is slow or may produce an incorrect answer if events fail to arrive within the fixed time interval. In response to this situation, the subject innovation employs punctuation and heartbeats in connection with a robust and scalable event processing system. The innovation discloses mechanisms by which heartbeats and timestamps can be regularly generated by low-level nodes (e.g., sources) and propagated through the network, to unblock standing event pattern queries and align events from multiple distributed streams.

17 Claims, 14 Drawing Sheets

EVENT STREAM CONDITIONING

BACKGROUND

Distributed event processing systems often require input streams that are ordered in some predetermined manner or that events arrive within a fixed time interval. This order may simply be arrival order or given explicitly on a specific event attribute, such as a timestamp or sequence number. Standing event queries, such as a temporal correlation of events across multiple streams, often block if an input stream is slow or may produce an incorrect answer if events fail to arrive within the fixed time interval.

Monitoring of distributed systems presents a unique challenge because the events of interest take place in many different places and are most often observed with at least some latency. Deeply networked environments can be highly volatile due to the number of communication links and disparate systems involved, as well as temporary disconnections, packet-loss and retransmission. Consequently, the time at which an event reaches an observer may be only loosely related to the time it actually occurred. Moreover, this latency can vary during monitoring. Most often, it is not practical (or economically feasible) to assign a globally consistent timestamp to each event which records the moment it occurred, because this would require perfectly synchronized clocks.

As stated above, monitoring of distributed systems presents a unique challenge because the events of interest occur in many different places and are most often observed with some latency. Of course, the latency depends on random factors such as connection bandwidth, routing paths, temporary disconnections, packet-loss and retransmission, etc. Therefore, the times at which the events reach some observer are only loosely related to the times at which they actually occurred. In the worst case the events might be observed in different order than their occurrence. On the other hand, because synchronization of distributed physical clocks is impracticable, it is not always possible to assign consistent timestamps to the events at the moment of occurrence.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that evaluates standing event queries over potentially infinite streams of events. In order for the system to produce useful output, it can unblock event operations such as simple aggregation (e.g., total number of orders received during a 15 minute time window) or temporal correlation of events across different streams (e.g., an event a followed by another event b within five minutes). At the same time, this specification discloses mechanisms that enable reasoning over both the order and times at which events arrive from different streams actually occurred, as opposed to 'were received'. The subject innovation discloses a generic pre-processing mechanism that reconstructs the order and the times of actual event occurrences independent of the latency of observation.

Distributed event processing systems, such as financial-based or commerce-based systems, often require input streams that are ordered in some predetermined manner or that events arrive within a fixed time interval. This order may simply be arrival order or given explicitly on a specific event attribute, such as a timestamp or sequence number. Standing event queries, such as a temporal correlation of events across multiple streams, often block if an input stream is slow. As well, conventional systems may produce an incorrect answer if events fail to arrive within the fixed time interval.

The subject innovation discloses the use of 'punctuation' and 'heartbeats' in a robust and scalable event processing system. Effectively, the innovation describes a stream conditioning mechanism developed for a high performance event processing service that can distributed applications. More particularly, the innovation discloses how heartbeats and timestamps can be regularly generated by low-level nodes (sources) and propagated throughout the network to unblock standing event pattern queries and align events from multiple distributed streams.

Aspects of the innovation are directed to systems and mechanisms that can establish logical (e.g., virtual) clocks based upon a number of physical clocks associated with multiple sources. It will be understood that the sources can be preprogrammed to automatically supply physical clock information or can be pinged from the observer in order to gather the necessary clock information. In any case, once the clock information is gathered, a logical clock can be established by which events can be managed.

Other aspects of the innovation disclose systems and methods for aligning event (e.g., data) streams to mask latency and disorder that is inherent in most best effort networks. It will be appreciated that this latency and disorder can lead to incorrect answers. Still other aspects disclose techniques of using heartbeat carrying punctuations sent from the event sources to unblock standing event queries, and to provide network latency information.

In yet another aspect thereof, an artificial intelligence (AI) and/or machine learning & reasoning (MLR) component is provided that employs a probabilistic and/or statistical-based analysis to prognose or infer an action that a user desires to be automatically performed. For example, AI and/or MLR mechanisms can be employed to automatically synchronize clocks and/or select/order events for output.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
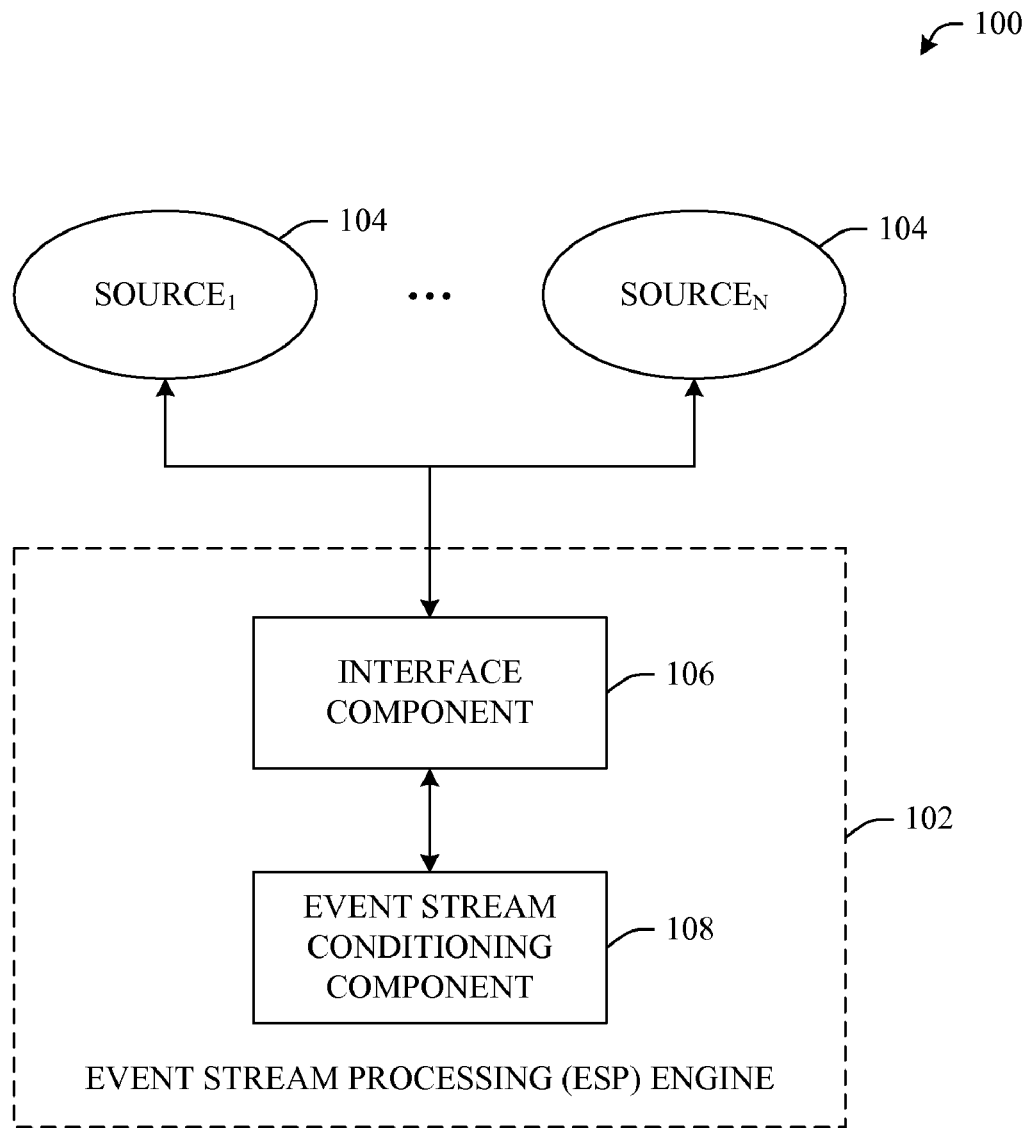
FIG. 1 illustrates an event stream processing engine that facilitates conditioning event streams in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "engine" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates conditioning event streams from a number of sources. It is to be understood that event stream processing (ESP) refers to technologies that assist in processing multiple streams of event data to identify meaningful events, to detect patterns and correlations within the events as well as relationships between events such as causality, timing, etc. Some examples of uses of ESP engines and systems relate to financial services, fraud detections, location-based services or the like. Although specific ESP scenarios will be described in this specification, it is to be understood that these scenarios are provided in order to add context to the innovation and are not intended to limit the scope of this disclosure and claims appended hereto in any way.

As illustrated in FIG. 1, system 100 can generally include an ESP engine 102 that manages event data received from 1 to N sources, where N is an integer. It will be appreciated that 1 to N sources can be referred to individually or collectively as sources 104.

One particular overall goal of the ESP engine 102 is to have the ability to query event streams from sources 104. In other words, much like people query relational database systems, one goal of the ESP engine 102 is to provide a system and/or mechanism whereby a user can query event streams. For instance, in one exemplary scenario, a user located at a department store central location (e.g., via ESP engine 102) would be able to pull and analyze accurate information from individually, and remotely, located teller sources (e.g., sources 104) without the need for each of the sources to have synchronized physical clocks.

With reference to FIG. 1, ESP engine 102 can include an interface component 106 and an event stream conditioning component 108 that receives event streams and conditions (e.g., orders) the streams respectively. As described supra, the subject innovation discloses mechanisms that analyze patterns and/or correlations of data over time. These mechanisms can be employed functionally by the event stream conditioning component 108.

Conventionally, these mechanisms that analyze patterns and correlations of data over time were not available as the individual sources each run an individual physical clock. Thus, in traditional systems, synchronization was needed between the sources in order too ensure proper management of incoming event streams.

In accordance with the subject innovation, techniques are described that establish a single logical clock according to the source's (104) physical clock. As well the subject innovation enables event stream management approximations (e.g., via event stream conditioning component 108) based upon the single logical clock. In other words, since a number of disparate physical clocks exist associated to each of the sources 104, the subject innovation enables these multiple clocks to be brought into alignment and to be viewed as a single logical clock. These aspects are illustrated in more detail with reference to FIG. 2 that follows.

Effectively, the event stream processing component 108 can be employed to align physical clocks into a single logical clock. As well, the event stream processing component 108 can be used to analyze and arrange event streams in accordance with the logical clock. Each of these functional aspects of the event stream conditioning component 108 will be described in greater detail below.

Figure 2:
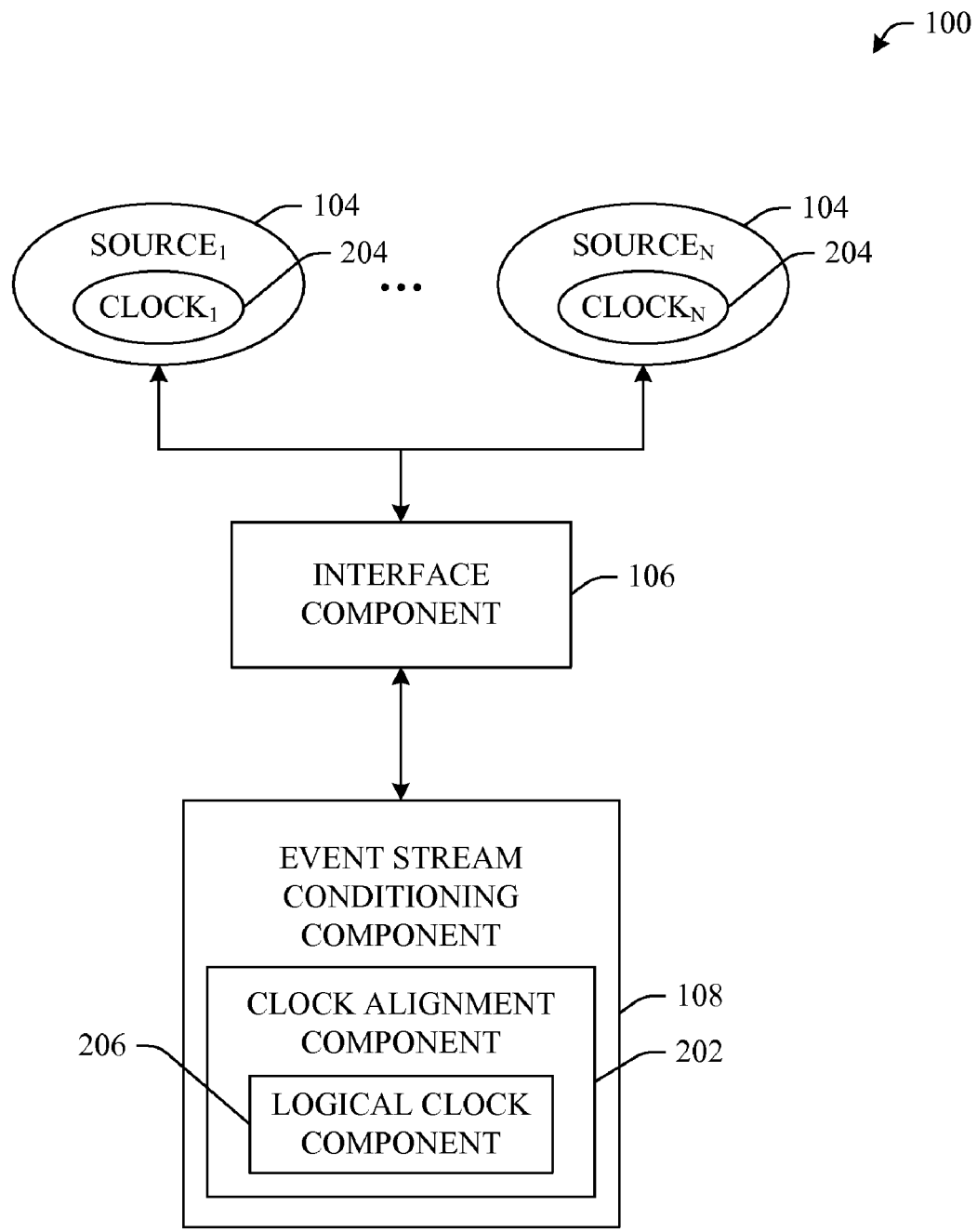
FIG. 2 illustrates a system that can establish a logical (e.g., virtual) clock that corresponds to multiple physical clocks of disparate sources in accordance with an aspect of the innovation.

An alternative block diagram of system 100 is illustrated in FIG. 2. With reference to FIG. 2, the event stream conditioning component 108 can include a clock alignment component 202 that can process clock information from 1 to N physical clocks (204), where N is an integer thereafter establishing a single logical clock 206.

In operation, the interface component 106 can be employed to query sources 104 for clock (204) information and event streams. As well, in other aspects, sources 104 can be preprogrammed to automatically push clock information and event streams to the interface component 106. In either case, the clock information and event streams can be supplied to the event stream conditioning component 108 whereby the clock alignment component 202 can be employed to apply algorithmic mechanisms to establish the logical clock component 206.

Figure 3:
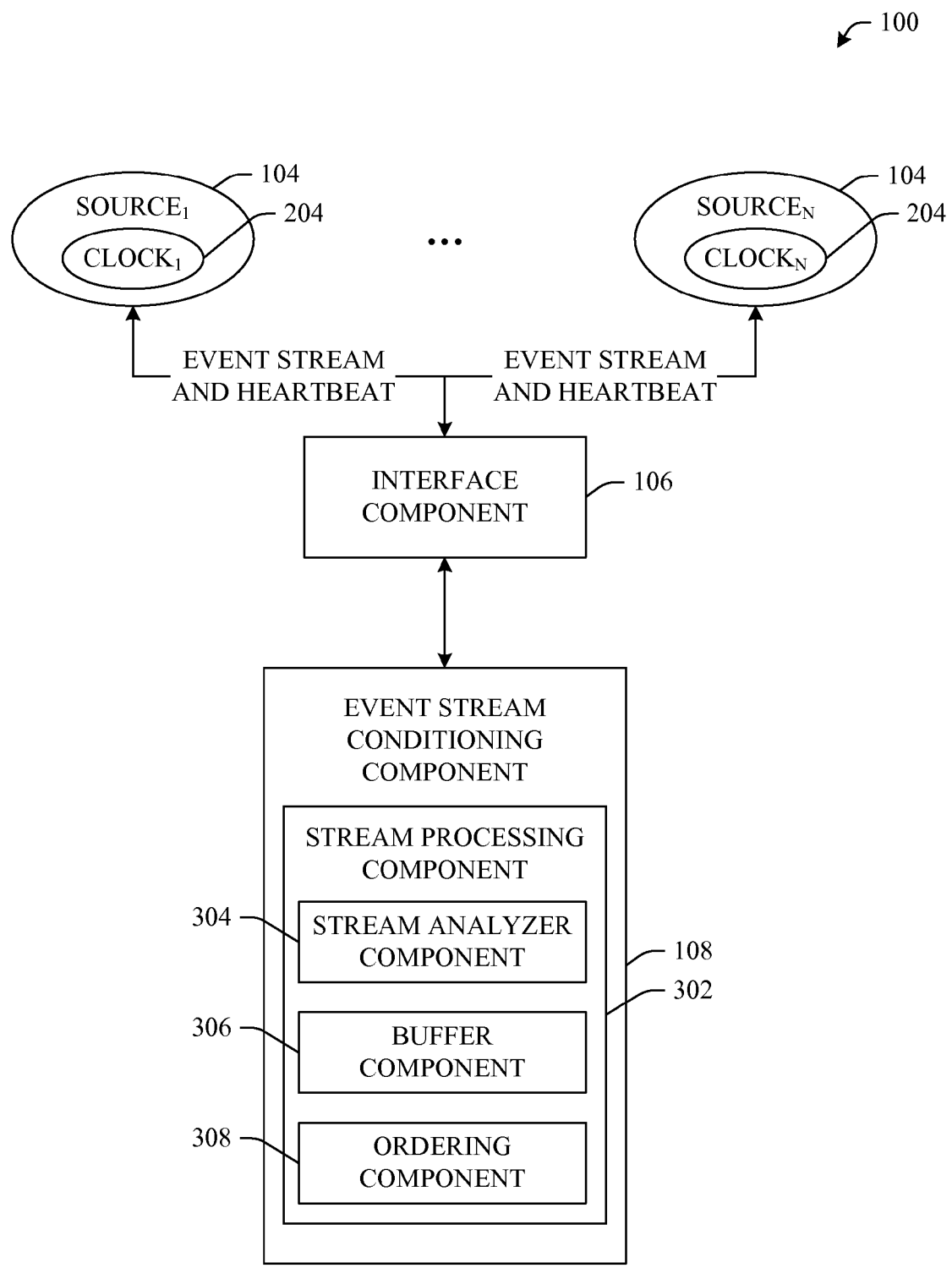
FIG. 3 illustrates a system that buffers and processes streams in accordance with an aspect of the innovation.

As well, the event stream conditioning component 108 can be employed to buffer events in time thus enabling the system 100 adequate time to process and effectively condition the streams based upon patterns and correlations. In other words, the event stream conditioning component 108 can buffer event streams received from multiple sources (104) until time-aligned streams are received. In doing so, the subject innovation discloses 'punctuations' that can be applied and used to facilitate this purpose. FIG. 3 that follows further illustrates components that assist in facilitating the buffering procedure(s) and mechanism(s).

With reference now to FIG. 3, an alternative block diagram of system 100 is shown in accordance with an aspect. More particularly, as shown in the figure, the event stream conditioning component 108 includes a stream processing component 302 having a stream analyzer component 304, a buffer component 306, and an ordering component 308. These components (304, 306, 308) facilitate conditioning multiple event streams in accordance with an established logical clock (e.g., logical clock component 206 of FIG. 2).

As stated above, the stream analyzer component 304 can employ 'punctuation' mechanisms that effectively and properly condition (and/or process) event streams. As used herein, 'punctuation' refers to heartbeat and other clock carrying information applied to and/or received from the distributed streams (e.g., sources 104). In operation, this information can be integrated and employed by the clock alignment component (202 of FIG. 2) thus making it possible to establish a logical clock (206 of FIG. 2) which represents a time relative to each of the sources 104. Moreover, heartbeat punctuations can be employed to align streams and to align stream processing algorithms.

It will be understood that, in order to understand what a source's clock is actually reading, one must account for the clock skew, not just latency. Therefore, it can be helpful to push and/or pull a time stamp from each of the sources 104. It is to be understood that the interface component 106 can either proactively ping each of the sources 104 for this information or the sources 104 can proactively send the information. In either scenario, the information can be provided to the event stream conditioning component 108 for processing.

In the first scenario, a request can be made to the source 104 to send back a timestamp. Thus, misalignment can be identified and addressed. Returning to the example of monitoring several teller sources, if the monitoring service registers 12 noon and one of the teller sources sends a timestamp of 11:59 am, it is apparent that the source's clock is running behind the monitor service clock. Thus, confidence intervals can be employed by querying the source(s) to send their respective timestamp.

It will be understood that, once latency can be understood, alignment of clocks is more easily established. This convergence on the actual clock values is presented in the proofs and theorems described below. Effectively, better alignment will enable better query results related to causality.

In one aspect, these novel alignment and conditioning mechanisms assist in reducing the ability for a malicious user to attack and/or infiltrate the system. For instance, the subject innovation can automatically monitor (e.g., query) sources and their associated physical clocks thereafter aligning the physical clocks into a single logical clock. Thus, the ability to mislead the system into thinking an event occurred before or after a particular time is reduced and/or eliminated.

Moreover, if there is a service level agreement (SLA) monitor or violation monitor that generates a billable event, it will be understood that any latency in monitoring can affect the accuracy of the billable action. In these scenarios, the system 100 of FIG. 3 can buffer events to ensure that it has seen all of the events up to a particular point in time. In summary, there are at least two features of the subject innovation: 1) clock alignment of the physical clocks into a logical clock and 2) using the 'punctuations' to process and/or condition streams.

Another example of a use of the subject innovation is with reference to eCommerce. For instance, frequently an eCommerce site advertises an item for sale whereby there are a fixed number of units available. Subsequently, orders are received and processed that correspond to these units. It can be particularly important to make sure that the order data received and inventory information maintained is correct when fulfilling orders as well as replenishing inventory. The accuracy of these systems is greatly affected by the timing of the events and corresponding clock skew and/or latency.

In other aspects, these time alignment algorithmic techniques can be employed to process retractions as well as orders. Effectively, it will be understood that handling the aspect of time (e.g., time alignment algorithms) can be particularly useful in many aspects of technology and business environments such as in handling retractions.

Monitoring and processing time correctly are key features of the subject innovation. In addition to enabling queries upon event streams, the subject innovation enables speculative execution of results so long as time is modeled correctly. In aspects, the system 100 enables pre-computing and speculative computing of event streams. As well, the innovation enables the user to view 'fuzzy' stream conditions if so desired. If 'fuzzy' views are not desired, the subject innovation can enable alignment to occur internally within the engine (e.g., 102 of FIG. 1) prior to presentation to a monitoring service. Essentially, the subject innovation enables speculative execution of event information.

As described supra, the system 100 can employ special control operators or 'punctuations' that can effectively guarantee that all events have been seen up to a point in time. This requires that all events in the network before a particular point in time be flushed. In one aspect, the stream analyzer component 304, buffer component 306 and ordering component 308 can be employed to effectuate this time-based stream process.

The stream analyzer component 304 can employ a time alignment algorithm or stream interleave operator to prompt and enable the buffering and alignment of events. As will be understood upon a review of the discussion infra, the ordering component 308 utilizes a low watermark 'punctuation' to permit events to flow forward through the system. Essentially, this low watermark is used as a benchmark to align event streams and to control flow of streams through the buffer component 306. In doing so, the subject innovation discloses a protocol that enables an understanding of clock skew. Dialog can be prompted between the remote sources 104 and the monitor service to enable convergence upon the logical time. As described above, this convergence enables physical clocks to be converted into one virtual logical clock.

It is to be understood that the system 100 can condition event streams as a function of correlation. For instance, the system can monitor, analyze, buffer and order events from multiple sources based upon information (e.g., punctuation, heartbeat) associated with the event stream(s). As well, the system 100 can address the absence of information by instructing the operator how to proceed. For example, if the monitor does not hear from a particular channel or source 104, the system 100 can determine if this is a result that there are no streams being received or because the system or particular source is down.

In these situations, the system 100 most often cannot make forward progress. Rather, event information is buffered into buffer component 306. In operation, the innovation discloses mechanisms to extract from the query, analyze the temporal correlation constraints, time constraints and, as a result, require a response from a source based upon the constraint. By way of more particular example, a query can be employed to require response from a source every X seconds or every X minutes based upon the query temporal constraint thereby enabling forward and efficient progress in processing event streams.

It has proven a challenge to incorporate such punctuation and heartbeats into a robust and scalable event processing system. The systems and mechanisms described in this disclosure describe a high performance event processing service that can assist in monitoring distributed applications. As will be described in further detail below, heartbeats and timestamps can be regularly generated by low-level nodes (e.g., sources) and propagated through the network. These heartbeats and timestamps can be used to unblock standing event pattern queries and align events from multiple distributed streams.

As described with reference to FIGS. 1-3 above, the subject innovation discloses a stream conditioning operator that can be employed over event streams to effectively preprocess incoming events. In aspects, the design is based upon three ideas to address the issue of timing: i) punctuation-carrying events, which communicate system heartbeats and clock information; ii) techniques to infer a global partial order of events arriving from different streams; and iii) a stream continuation, which hides (e.g., buffers) out-of-order events from analysis.

Punctuation-carrying events can be generated by low-level event sources and propagated through the system to enable operators in standing queries to unblock. Stream conditioning can align events coming from various streams so the arrival order more closely reflects the occurrence time of the events. In accordance with an aspect of the innovation, a field of the event can be identified as behaving like a timestamp in order to address the timing of events.

By way of example, the innovation describes a system that can be employed as a general purpose event service for use in distributed event monitoring applications, ranging from business activity monitoring (BAM) to enterprise wide monitoring of computer system security. Other applications of the innovation will be understood and appreciated by those skilled in the art. The innovation suggests a single console from which users can register a standing event pattern query. As well, a routing path for events to flow from individual sources to the monitoring system can be created, possibly pushing filters and operators closer to sources.

Figure 4:
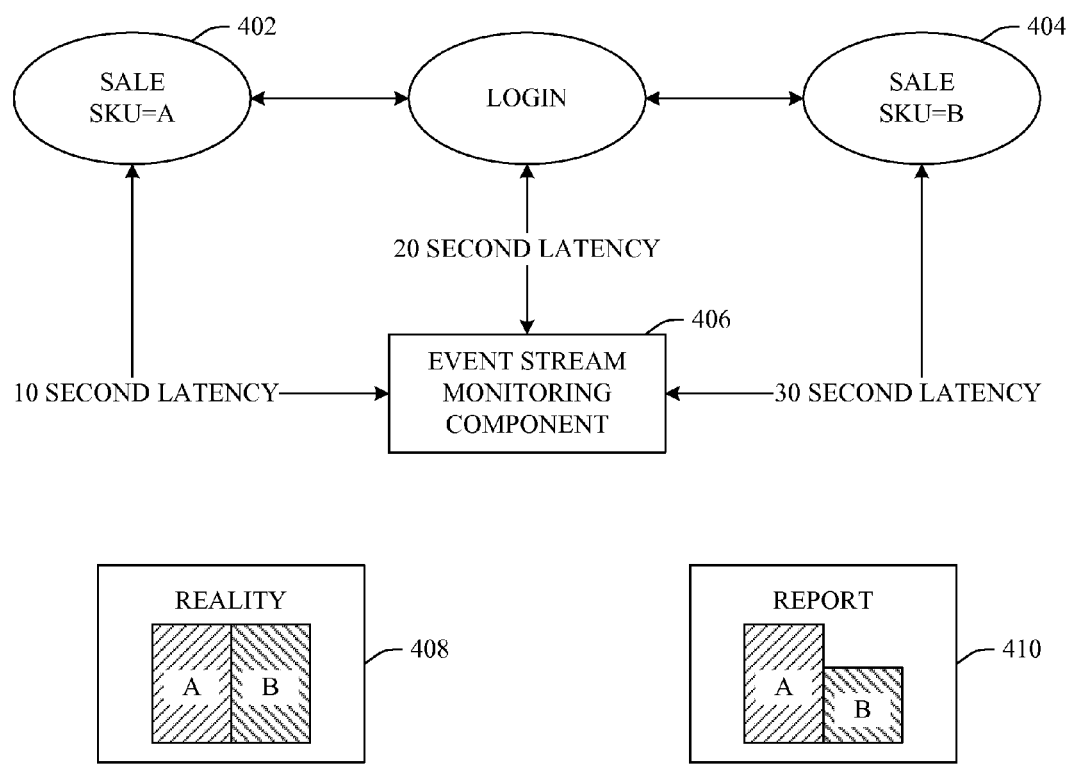
FIG. 4 illustrates an example of a commerce system that can employ event stream management in accordance with an aspect of the innovation.

A more specific example of the impact of latency on data views is illustrated in FIG. 4. In accordance with this example, imagine a simple commerce site that sells the products A and B (402, 404). In accordance therewith, the state of the system is sometimes maintained within a central database (not shown). Thus, a report can be obtained that identifies the sales of A and B at any instance in time. There is no latency involved, because the events of 'sale' are appearing instantaneously in the database when the transaction commits.

Imagine for a contrast, a trade portal that redirects the users that want to buy A to one web service that has its own database and users that want to buy B to another, and a monitoring server (e.g., event stream monitoring component 406) that monitors both services. This architecture is illustrated in FIG. 4.

In accordance with this example, an assumption is made that the products A and B are selling exactly the same. Therefore, when a user asks for a report regarding the sales in the last minute, they would expect to see a report like the bar chart 408 on the left. If however the events of B-sales are observed with latency of 30 seconds by the monitoring server 406, while the A-sales have only 10 second latency, the result will likely be the bar chart 410 on the right. This report shows that A is selling much better than B which may likely prompt incorrect/premature business measures and/or decisions, such as adjusting prices, ordering larger quantities of A, etc. It will be appreciated that this example of FIG. 4 illustrates a scenario similar to viewing data that is not yet committed.

Figure 5:
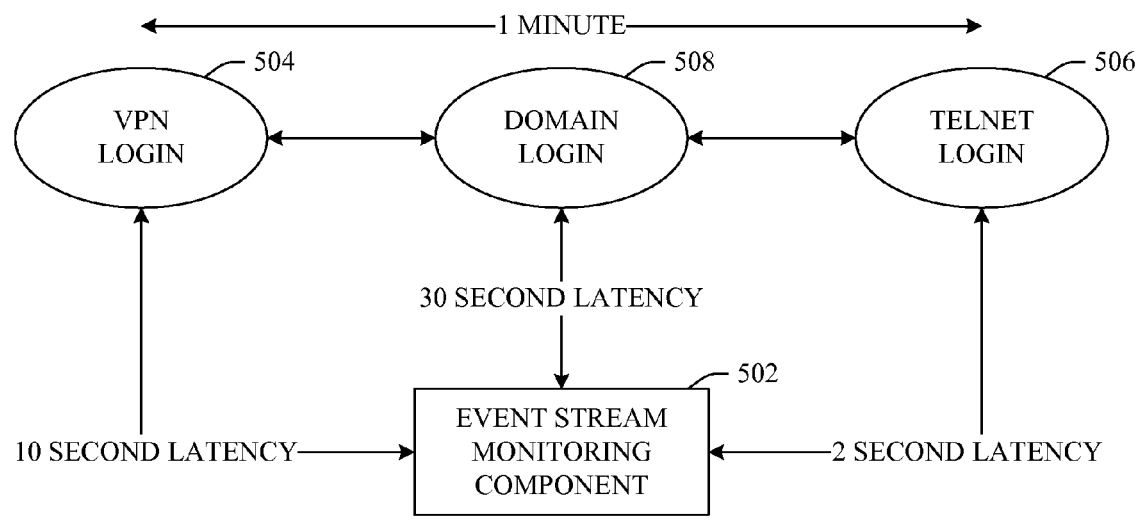
FIG. 5 illustrates a system that employs an event stream monitoring system to detect network security violations in accordance with an aspect of the innovation.

Another example of an implementation of the innovation is illustrated with reference to FIG. 5. Generally, FIG. 5 illustrates an architectural block diagram of a system 500 that represents an event monitoring system to detect security violations. As can be appreciated, system administrators often attempt to mitigate hacker attacks by ensuring that all users go through secure client software that enforces a domain login before any other operation is permitted. This of course does not prevent hackers from imitating the necessary packets to login to the virtual private network (VPN) and then access services on the network without a domain login.

A specific monitoring solution (e.g., event stream monitoring component 502) can be implemented as an event pattern query to watch for sequence of events, specifically VPN-Login (504), followed by Telnet-Login (506), with no Domain-Login (508) in between. If network latencies are negligible compared to the time between the events, this simple event pattern query could suffice. However, difficulties arise if the monitoring system 502 receives events from the domain controller (e.g., 30 seconds) with more latency than other events. An example of latencies is illustrated in FIG. 5. In conventional systems, the architecture of FIG. 5 can potentially result in hundreds of false alerts showing 2 seconds after the Telnet-Login 506.

In conventional systems, it could be possible to experience a 'hacker alert' for every single user that logs into Telnet. This is because the monitoring server 502 will see the VPN-Login 504 and the Telnet-Login 506 events, but the corresponding Domain-Login 508 will still be on the wire. This shortcoming in event correlation is because the order in which events are observed differs from the order in which they actually occurred.

This specification discloses and demonstrates that it is possible to build a 'generic' pre-processing mechanism that efficiently reconstructs the order and the times of actual event occurrences, independent of the latency of observation. In the discussion that follows, the intuition behind a solution is provided. In the example of FIG. 5, it is easy to see that the problem is a result of reasoning over events in a range of time in the recent past. These events can be so recent such that all relevant events may not have been observed, as illustrated in FIG. 6.

Figure 6:
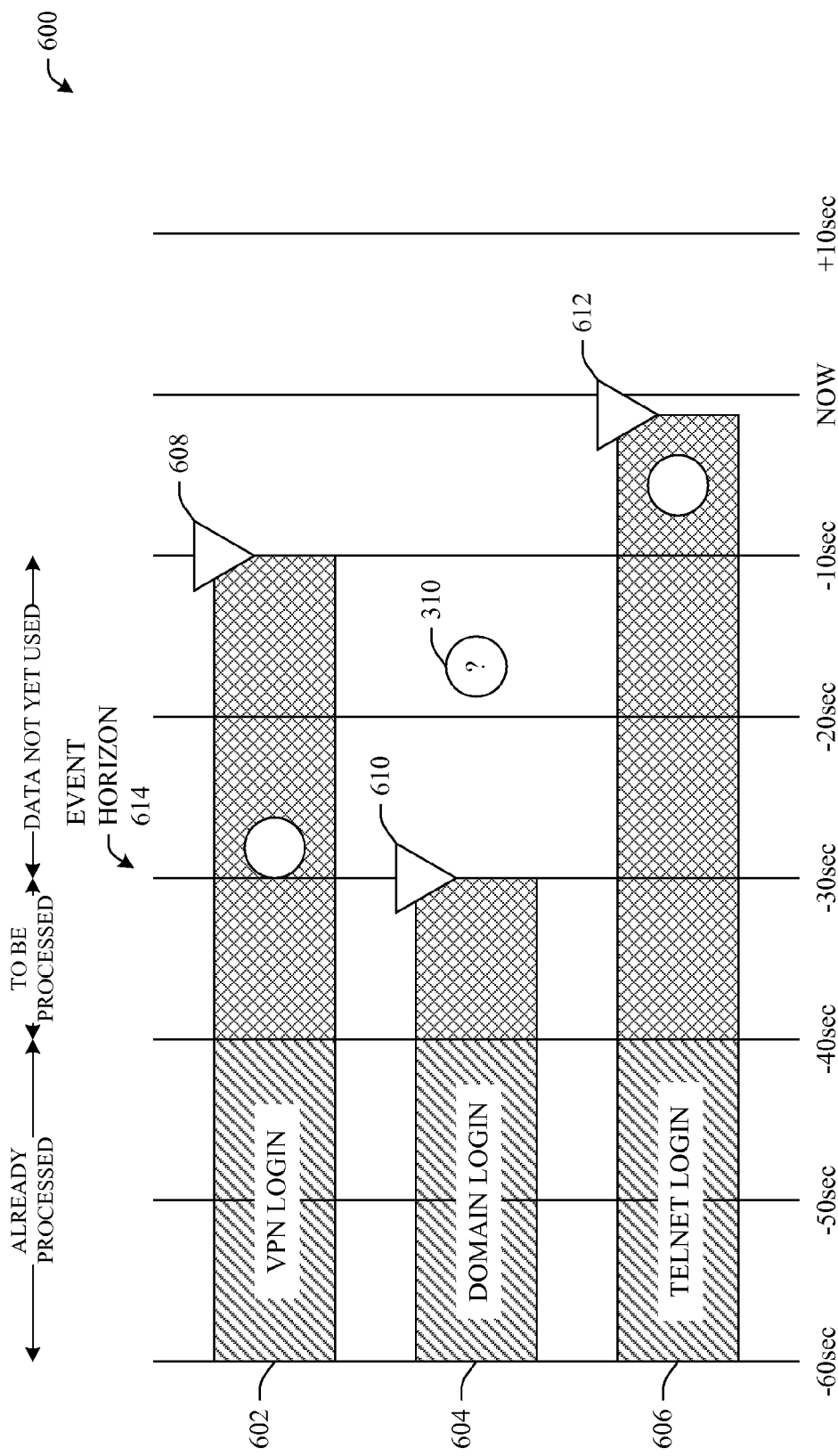
FIG. 6 illustrates a timeline of events of a network security event monitoring system in accordance with an aspect of the innovation.

Referring now to FIG. 6, and continuing with the example of FIG. 5, a timeline of events 600 is shown. This timeline 600 illustrates the role of event stream watermarks in accordance with an aspect of the innovation. Referring to the timeline 600, the X axis represents time and the bars represent events received in time from the different streams in the security scenario. The top bar 602 shows the events from the VPN. Because of latency, the monitoring server knows only about events that occurred up to 10 seconds ago. Similarly, as illustrated by the bars 604 and 606, Domain Login is 30 seconds behind and, similarly, Telnet-Login is 2 seconds behind present time.

The intuition behind the solution is to introduce stream bookmarks (608, 610, 612) equal to the occurrence time of the last event received from each stream, and to calculate an event horizon as the minimum of all bookmarks. Reasoning over events more recent than the event horizon can be speculative at best, and can lead to an incorrect answer.

Here, for example, one can observe that VPN-Login 602 occurred 28 seconds ago and a Telnet-Login 606 occurred 5 seconds ago, but simply do not yet know whether or not a Domain-Login 604 occurred in between. It is to be understood that the system responsible for performing event correlation to detect security violations has only the information about its local clock readily available and can not assume all clocks are perfectly synchronized.

As described above, in an effort to address timing issues, the subject innovation can be described with reference to three specific areas. First, the innovation employs punctuation-carrying events, which communicate system heartbeats, local clock information, etc. Second, techniques that infer a global partial order of events arriving from different streams (sources) are provided. Finally, a stream continuation which hides (e.g., buffers) out-of-order events from analysis is described. Each of these three areas will be described in greater detail below.

For simplicity, it is initially assumed that the ordered delivery of events from an individual source is handled by the lower level message transports that connect event sources with event (sinks) operators. The innovation can be implemented as a stream conditioning operator over event streams, which preprocess incoming events. Inputs to the operator are all events arriving from multiple distinct streams (sources). The output is a single stream in which all events are in order of occurrence with timestamps aligned to the clock of the monitoring server (e.g., logical clock). This stream conditioning operator can be used before any event correlation or event pattern query, such as the system security violation example presented earlier.

In both the examples above, it is easy to notice that the problems appeared because reasoning was taking place over events in range of time in the very near past. Therefore, not all relevant events were observed timely due to the lags noted. This time-range of 'sparse' information is similar to data that is not yet committed, as illustrated in FIG. 6.

As described supra, in accordance with FIG. 6, the X axis represents time, and the bars (602, 604, 606) represent the events received so far from different streams discussed in the above security scenario. The top bar 602 shows the events from the VPN. Due to the latency, the monitoring server knows only about the events that occurred up to 10 seconds ago. Similarly, the system is 30 s behind for Domain-Logon 604, and only 2 s behind for Telnet-Logon 606.

The intuition about a solution is to introduce 'stream bookmarks' equal to the occurrence time of the last event received from each stream, and to calculate the 'Event Horizon' 614 as the minimum of all bookmarks (608, 610, 612). Reasoning over the data that is newer than the event horizon 614 is dangerous. Here, for example, one might have observed VPN-Login 602 that occurred 28 seconds ago and a Telnet-Login 606 that occurred 5 seconds ago, but it is not possible to know whether or not there a Domain-Login 604 that occurred in between.

Theoretically, when one assumes Newtonian space-time, the occurrence time of all events can be based on a single clock, for example, the clock of the monitoring server. Practically speaking however, at the time of occurrence of an event, only the local clock (e.g., 206 of FIG. 2) is readily available to include as 'occurrence time'. Obviously, it is not prudent (or possible) to assume that all clocks are perfectly synchronized.

Thus, the subject innovation bases an approach on two ideas that deal with this problem. Basis is made upon Lamport clocks, which describe how to infer a global order of the events in a distributed system. Secondly, the BAM continuation refers to a generic approach of hiding (e.g., buffering) the out-of-order data from further analysis in monitoring applications. For simplicity, also assume that the ordered delivery of the events from individual sources is handled at lower level transports that connect event operators with the event sources.

In one aspect, the innovation discloses the use of preprocessing operators for the event streams. The inputs for this operator can be multiple event streams from different sources, and the output can be a single event stream in which the events are in the order of occurrence and have correct timestamps as per the clock of the monitoring server. This pre-processing operator can be used before any monitoring application, such as the state machine and the report generation described above.

Figure 7:
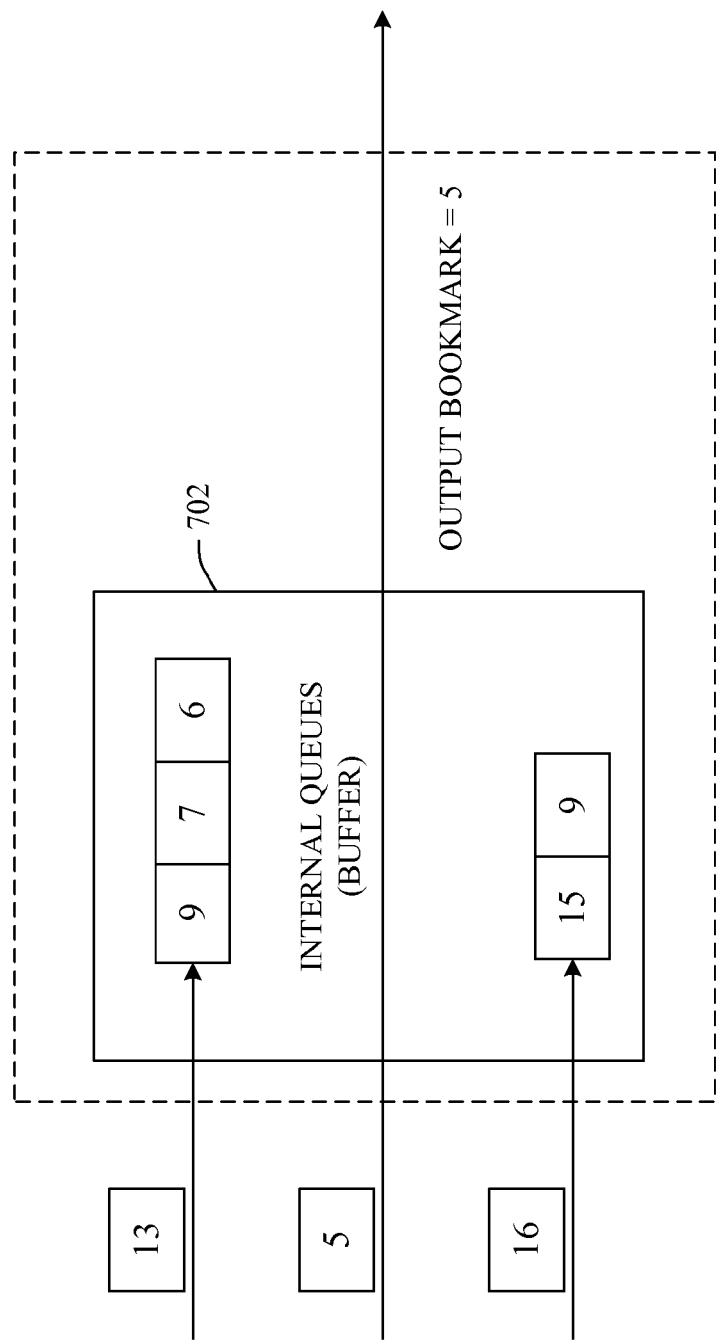
FIG. 7 illustrates the queue/dequeue functionality of a stream interleave operator in accordance with an aspect of the innovation.

Turning now to a discussion of a simple stream interleave operator, this discussion begins by solving the simple case when the clocks of all event sources are synchronized (e.g., by using Lamport clocks), and all events contain the local clock value. FIG. 7 is an illustration of the stream interleave operator.

In particular, this operator assumes that each input event contains a clock value of t. As well, the events from each stream are ordered in increasing order of t, so that if event e1 is followed by e2 in the same stream then $e2.t \geq e1.t$. The stream interleave operator maintains internal state consisting of an 'output bookmark' and internal queue for each stream.

As shown in FIG. 7, event streams can be received and processed in accordance with the current output bookmark. In the example shown, event streams with bookmarks 9, 7, 6, 15 and 9 are resident within the internal queue or buffer 702. Essentially, these streams are maintained within the buffer until a stream equal to or less than the output bookmark is received.

In the example, the output bookmark is currently set at a value of 5. In this case, when events with bookmarks 13, 5, and 16 are received from multiple channels, the system can analyze the events thereby comparing the current output bookmark to the bookmarks of the received streams. In this example, since the event stream from the second source has a bookmark equal to the current output bookmark (e.g., 5), the stream is passed through to the output.

Figure 8:
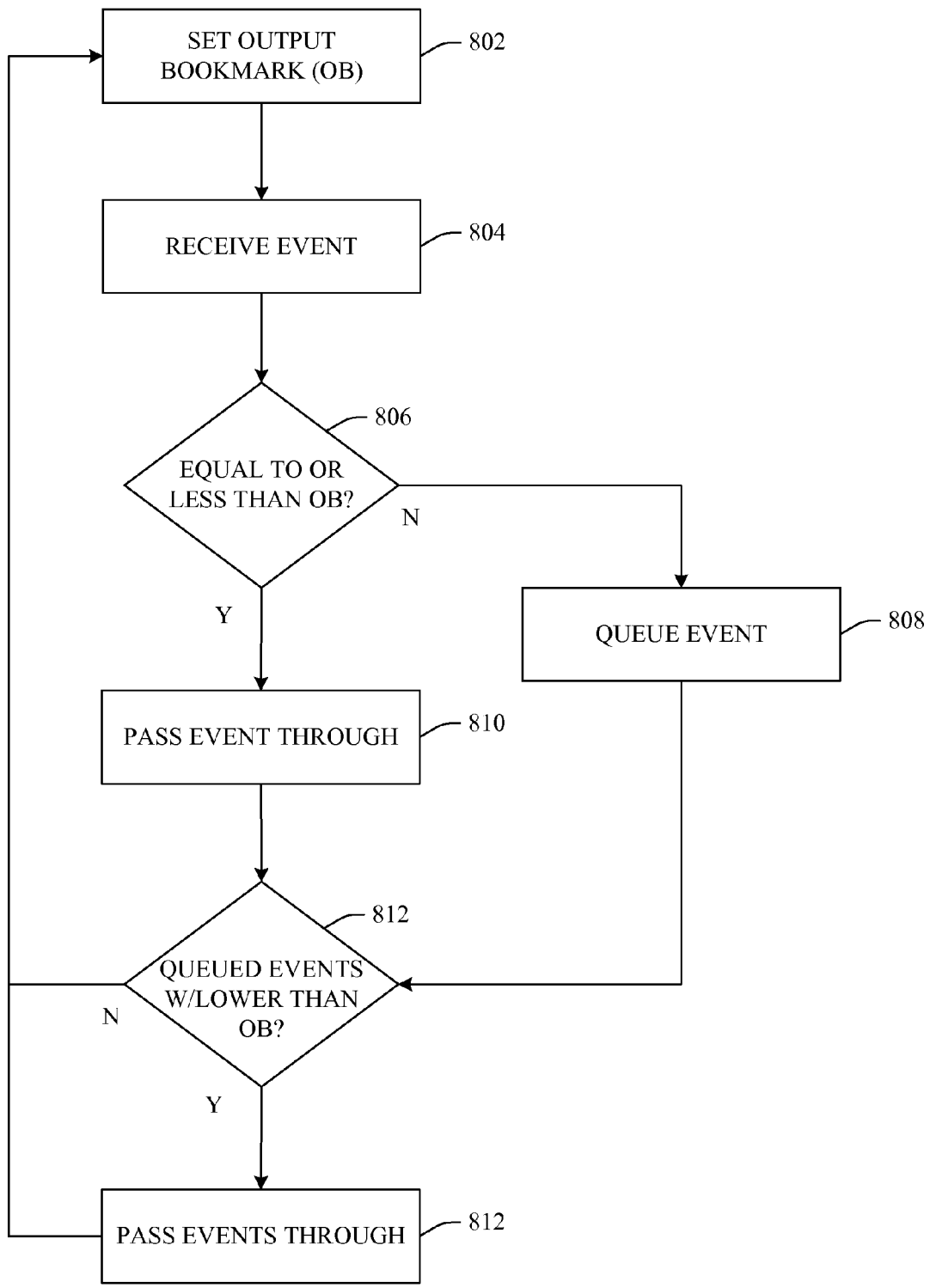
FIG. 8 illustrates an exemplary flow chart of procedures that facilitate queuing and/or dequeing events in accordance with an aspect of the innovation.

This output bookmark is employed in accordance with an algorithm. FIG. 8 illustrates a methodology of an output bookmark algorithm in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 802 the output bookmark is set. Frequently, the output bookmark is initially set to value that is equal to or less than the starting value of all clocks (e.g., 0). An event is received at 804 and analyzed at 806. If a determination is made at 806 that the bookmark of the received event is not equal to less than the output bookmark, the event will be queued at 808. For example, as shown in FIG. 7, the event can be queued within the buffer 702.

If the bookmark of the received event is equal to or less than the output bookmark the event is passed through to the output at 810. Next, once the event is passed through or queued, at 812, a determination is made to identify other queued events having bookmarks equal to or lower than the output bookmark. If events exist in the queue with a bookmark equal to or less than the output bookmark, these events will be passed through to the output at 812. As shown, the output bookmark can be reset and the process repeats.

In operation, when all queues are non-empty, the output bookmark is set to the minimum of the clocks of the events at the top of each queue. Events from all queues that have this clock are dequeued and sent to the output in random order that might depend on the implementation. It is to be understood that events that occur at the same time (e.g., identical bookmarks) are considered 'concurrent' and the order between them is not relevant.

In one aspect, a decision or rule can be preprogrammed or inferred to determine how to handle the cases of 'concurrent' streams. For example, a rule can be preprogrammed to release events from S1 before the events from S2, etc. Alternatively, the events may be shuffled in some other random manner. This process can be repeated until there is at least one empty queue. In other words, each event 'pushes out' all events with earlier clocks until some queue is empty.

With reference again to FIG. 7, the output bookmark is equal to 5. Thus, the event coming from stream S2 will be sent to the output immediately, while the events from S1 and S3 will be enqueued. If a subsequent event with t=6 is received from S2, it will 'unblock' the event at top of the queue for S1 and there will be two events in the output.

Following is a discussion of two theorems and corresponding proofs that illustrate examples of algorithmic logic employed in connection with aspects of the subject innovation.

Theorem 1:

If each event stream originates from a single process in a Lamport-clock system and the events on each stream are delivered in order, then the output event stream will be sorted so that the causality is preserved:

If e1→e2, where → is the order relation defined by Lamport, Then e1 will appear in the output before e2.

Proof:

First, notice that the local clock of each process in a Lamport system is always increasing. This combined with the in-order-delivery ensures that if event e1 is received and then followed by e2 on the same stream then e2.t>e1.t. This assertion is stronger than what the stream interleave needs (e2.t≧e1.t) and so the input assumptions can be satisfied. As described below, assuming weaker input conditions will allow the user to cascade the stream interleave operators.

As per the definition of the relation →, there are three possibilities of having e1→e2:
 a) e1 and e2 occur in the same process and e1 happens before e2;
 b) e1 represents sending of a message and e2 represents receiving of this message by a different process; and
 c) there is a sequence of events x1, x2 . . . xN so that e1→x1→x2→ . . . →xN→e2, and each → represents basic cases of (a) or (b).

In case (a), because of the ordered delivery e1 is received by the Stream Interleave Operator before e2. But then, one can notice events from the same stream get queued and eventually wait for events from the other streams, but show up at the output in the same order as in the original stream.

In case (b) the Lamport rules (IR2 and IR2') ensure that e2.t>e1.t but the events might be observed out-of-order because they happen in different processes. For the sake of simplicity we first assume that e1 happens on S1, e2 happens on S2 and there are no other input streams.

In case e1 is observed first then:
 If the queue for S1 is empty and the Output Bookmark is the same as e1.t, then e1 will be sent out immediately, and thus before e2.
 If the Output Bookmark is less than e1.t, then e1 will be queued and all events with clocks less than e1.t will be pushed out from both streams. Here, there are two sub cases to consider:
  There is some event x on the stream S2 which occurs before e2 so that e2.t>x.t≧e1.t In this case e1 will be pushed out when x is observed, or immediately if x happens to be observed before e1; and
  The first event that is received on S2 is e2. In this case e1 will be pushed out, while e2 still remains on the queue.

In the case when e2 is received first, it will always be queued because the Output Bookmark is incremented only to the minimum clock of the received events from all streams, and e1 is not yet observed. Upon receiving of e2, all events with clock less than e2 will be pushed out, and so the queue for S1 will be empty. When e1 is received, the Output Bookmark will be incremented to e1.t, e1 will be pushed out and so the queue for S1 will be empty while e2 remains on the queue for S2.

Finally, it will be understood that swapping S1 with S2 and having other streams in the picture does not change the logic described above.

Turning now to a discussion of QoS for latency using heartbeats. The interleave algorithmic logic described above has the disadvantage that if there are no events in one stream, the events from all other streams will just accumulate in the queues and there will be nothing in the output until the system runs out of storage. In this case, it is particularly important to support guaranteed latency of the output as QoS. Because it can be desirable for this QoS to hold in physical time, the following discussion will focus on continuous physical clocks. It will be appreciated that one can imagine integer clocks on normal events and physical as well as integer clock on the heartbeats.

To achieve this, heartbeats can be introduced on the input streams with the following assumptions:
 Each event source fires a special heartbeat event when there are no real events for time interval η. Just like any other event, the heartbeat contains the local clock t;

Each input event e is observed with latency $\mu(e) \in [\mu_{min}, \mu_{max}]$ where $\xi = \mu_{max} - \mu_{min}$ is the unpredictable latency; and The clock difference among the sources is $|C_i(t) - C_j(t)| < \epsilon$.

It is also assumed that $\epsilon$ and $\mu_{min}$ are much smaller than the heartbeat interval $\eta$.

Theorem 2:

With the above assumptions, the latency of the output events is $\mu_{out}(e) = \mu_0 + \mu_{wait}$ where $\mu_0$ is some small latency that is due to processing in the operator and $\mu_{wait} \in [\mu_{min}, \mu_{max} + \eta + \epsilon]$ is the latency due to waiting for other events. The unpredictable component of this latency is then $\xi_{out} = \xi + \eta + \epsilon$.

Proof:

The least latency at the output obviously occurs when e happens to arrive with latency $\mu_{min}$, and its time is equal to the Output Bookmark or there are queued events for all other streams allowing e to be dequeued and send out immediately. The maximum latency can be obtained by the Lamport diagram illustrated in FIG. 9.

Figure 9:
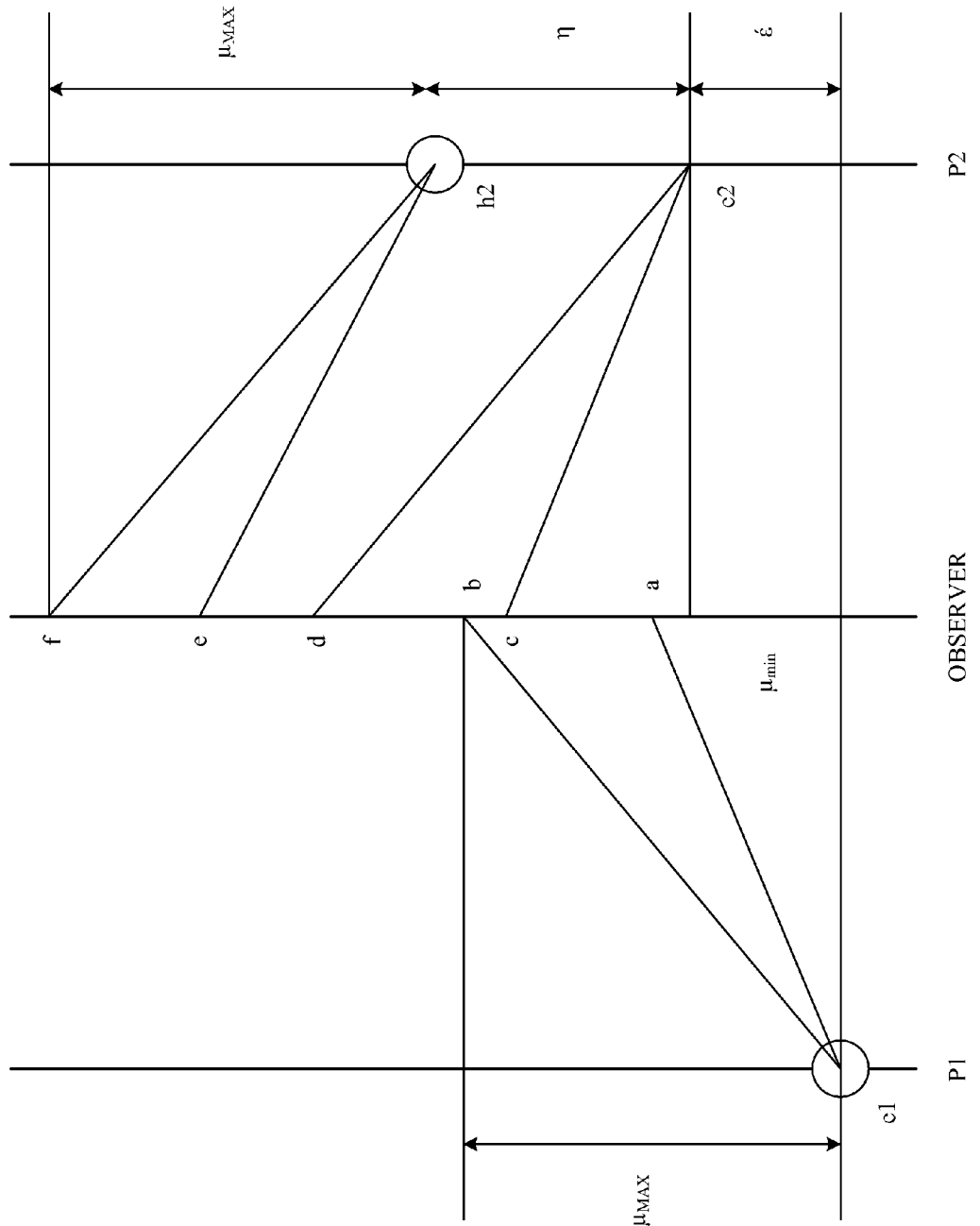
FIG. 9 illustrates the physical timing of events in accordance with a proof of theorem 2 as described herein.

With reference to FIG. 9, here the physical time increases upward, and the vertical lines for P1 and P2 represent the processes that generate the input events. The event first noticed is e1 which happens in P1. This event arrives at the observer at some time between a and b.

This however is not sufficient to see e1 in the output, because it will only show up if some other event e2 from P2 happens to have the same or greater clock value. If the clocks were in synch, this event will be represented by point x. Since the clocks might mismatch up to $\epsilon$, the 'unblocking event' must occur no earlier than physical time $\epsilon$ from the beginning because any earlier event will have clock value less than e1.

The worst case is when e2 does not happen. At this point, there was some other event or heartbeat immediately before and there are no more real events in P2. In this case the system must wait for duration of $\eta$ for a heartbeat to occur in P2 and up to $\mu_{max}$ to see this event in the observer.

Issues get somewhat more complicated when the clocks might run at different rates or when different streams have different latencies and heartbeat intervals. Similar to the above, it is easy to prove that the general formula is:

$$\mu_{wait} \in [\mu_{min}^{this}, \max(\mu_{max}^{this}, \epsilon + \max(\mu_{max}^{other} + \eta^{other}))]$$

Here the superscript "this" means the current stream and "other" ranges over the rest of the streams.

Turning to a discussion of complex stream interleave, the Lamport clock approach achieves global order of the events but at very high cost, because it requires: a) propagation of special data (e.g., the clock) in each message; and b) special behavior of adjusting the clock with each received message.

In practice, the distributed systems are most often built from existing components that communicate via well-known protocols. Changing such components to fire more data as monitoring events is feasible, but extending what is sent on the wire to achieve (a) is impossible in many cases.

The changing of the clock when a message is received (b) is particularly dangerous for systems that deal with real-time events in the physical world, for example systems for calculating trajectories, moving robots, calculating temporal metrics for stocks etc. Abruptly jerking the local clock forward because a message has been received is unacceptable in many cases.

Further, in the general case it is not always easy to keep track of all interactions that can qualify for 'receiving a message', e.g., is reading a shared file a message?; is reading a database record modified by another process?; is receiving an event that a mutex is granted?

Lamport proves that the integer-clock approach is especially fragile when external causality is involved, which is the case for most monitoring systems that watch for patterns of interest to occur. The physical clock approach on the other hand avoids anomalous behavior only when the latency of the messages is bounded and the messages are exchanged often enough. However, it can be useful to determine if this true for all things that can qualify as 'receiving a message' listed above.

Therefore, the direct implementation of Lamport clocks is great when restricted to specific protocol or message exchange infrastructure, but assumes too many things to be the base of generic monitoring system. The interleave operator described herein leverages all the strengths of Lamport clocks, but does all the clock adjustments on observer side. The 'send' and 'receive' are then identified by applying rules to the monitoring events and correlated together in a way that is similar to the BAM continuation.

The assumptions in this case are that:
a) The system being monitored consists of multiple processes $P_i$, each of them maintaining its own clock $C_i(t)$;
b) After a message m is sent from the process $P_i$, it fires monitoring event send$\langle M, c, C_i(t) \rangle$ where
   M is the type of the message about to be sent;
   c is a 'correlation token'; and
   $C_i(t)$ is the local clock of the process $P_i$ at the moment of sending m;
c) After receiving the message m the process $P_j$ fires a monitoring event receive$\langle M, c, C_j(t) \rangle$ where
   M is the type of the message that was received;
   c is the 'correlation token' received with the message; and
   $C_j(t)$ is the local clock of the process $P_i$ at the moment of receiving m; and
d) The monitoring server is considered process $P_0$ and also follows the above rules.

Just like in the Lamport case, the processes must exchange messages often enough—at least one message for interval of time $\tau$.

It is important to note that those requirements are much easier to meet because:
There is no requirement that any clocks are synchronized with any other clocks, or as described below, that they even run at the same speed;
There is no need to propagate any additional data with the messages—the correlation token c is either some unique piece of data that is contained in the message anyway, or something that is easy to calculate from the message (e.g., 128 bit hash); and
In particular, note that there is no need to propagate the message type M with the message. All that is required is that the send and receive monitoring events have matching M which can be hard-coded in both processes.

Figure 10:
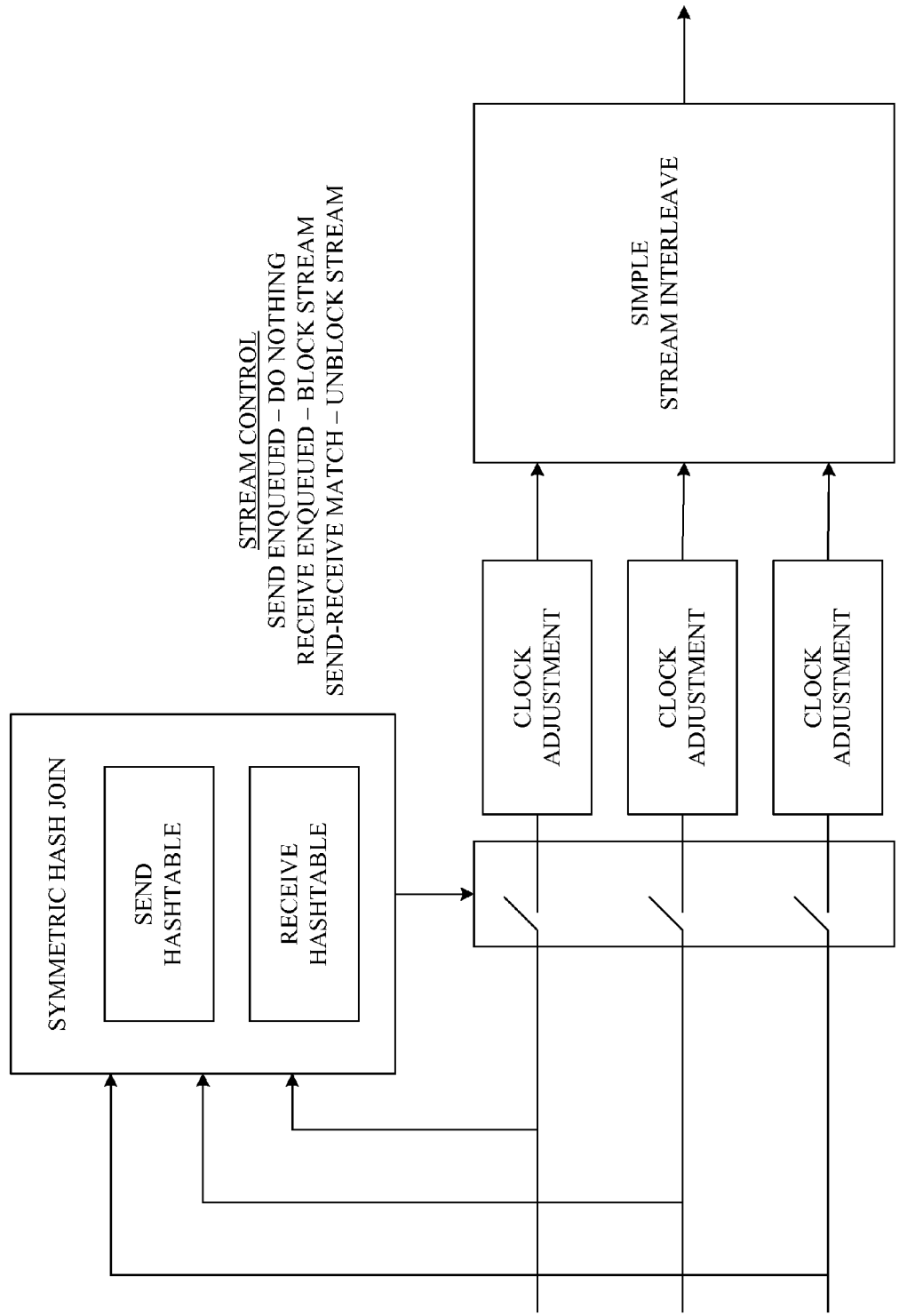
FIG. 10 illustrates a processing operator in accordance with an aspect of the innovation.

The processing operator in this case can be as illustrated in FIG. 10. In accordance with FIG. 10, the algorithm is as follows:
The send and receive events from all streams are fed into a symmetric hash join operator. This operator first tries to match the send-receive pair by looking in the other hashtable and if there is no match, enqueues the send or receive event in the corresponding hashtable. The key here is the pair {M, c} where M is the type of message and c is the correlation token. The payload is the pair $\{i, C_i(t)\}$ where i is the identifier of the input stream and $C_i(t)$ is the local clock from the event payload;

The output of this operator is an event that indicates what happened and is used to block and unblock the event streams as follows:

If the event was send and it was enqueued (e.g., corresponding receive was not found) then nothing happens;

If the event was received and it was enqueued (e.g., corresponding send event was not found) the source stream of the event is blocked, and all events start queuing; and If there was a matching send-receive pair, then the stream j on which the receive event happened is unblocked and a new 'clock adjustment' is calculated for this stream as $\Delta C_j = \max(C_j, C_i + \mu_{min}) - C_j$ where $C_i$ is the clock from the send event, $C_j$ is the clock from the receive event, and $\mu_{min}$ is the minimum latency for this type of message exchange;

The Clock Adjustment adds the adjustment $\Delta C$ to each event on the corresponding stream; and The Simple Stream Interleave is the operator described above that orders the output events so that the clock values always increase. Note that those values here are the computed values $C'_j(t) = C_j(t) + \Delta C_j(t)$.

Suppose a system of processes $P_i$ each of which maintains two types of clocks: $C_i(t)$ which is the Lamport clock, that is possibly reset on some received messages, and $C_i^o(t)$ which is the corresponding physical clock that is never reset.

Each process fires a monitoring event for everything that occurs which are then delivered in-order to $P_0$ for analysis. It is to be appreciated that the individual monitoring events should not be treated as messages because the number of messages explodes infinitely. Sending or receiving of a message will produce two more events, but since they are messages too, then sending and receiving them should also result in monitoring events, etc. To avoid this complication we will assume either:

Batching many monitoring events into a single message; or

Still delivering the individual monitoring events as messages, but not firing further monitoring events and not doing Lamport clock-adjustment on receive.

For simplicity, one can ignore this implementation detail and assume that the streams of monitoring events happen behind the scenes and are not related to the message traffic that is being monitored.

Theorem 3:

The following two cases will result in exactly the same output result:

All processes attach their Lamport clock to the monitoring events. The process $P_0$ uses Simple Stream Interleave operator to produce a single stream with global order; and All processes attach their physical clocks $C_i^o(t)$ to the monitoring events. The process $P_0$ uses Complex Stream Interleave operator.

Proof:

The proof starts by considering the processes before they exchange any messages (e.g., monitoring events are ignored or batch is not yet sent). Obviously, so far the Lamport clocks and the physical clocks are the same. In the case of complex interleave, since there were no send and receive events, all streams go directly to the simple interleave operator. The output in both cases is the same because the same event streams are processed with the same simple interleave logic.

Consider now $P_i$ sends a message to $P_j$ at time $t_1$. Since the message is not yet received, no clocks were Lamport-adjusted and thus the diagnostic events are still the same. In the case of complex interleave the send event is enqueued in the corresponding hashtable, but this has no impact on the main streams—they still go directly into the simple interleave.

When $P_j$ receives the message at time $t_2$ there are two cases:

a) The current local clock $C_j(t_2) = C_j^o(t_2)$ happened to be greater than $C_i(t_1) + \mu_{min}$, and so there was no clock adjustment; and b) The clock was set forward with $\Delta C = C_i(t_1) + \mu_{min} - C_j(t_2)$.

In the case (a), the clocks of all diagnostic events continue to be the same. The simple interleave naturally orders all events from $P_j$ that happened after the receive to occur in the output after the send from $P_i$. In the case of complex interleave the receive$(M, C, C_j(t_2))$ event matches the previously queued event send$(M, c, C_i(t_1))$. The stream from $P_j$ was not blocked, and thus, the unblocking has no effect. The new clock adjustment is 0 since $C_j(t_2) > C_i(t_1) + \mu_{min}$. Therefore, the same result is obtained.

In the case (b), the clock unblocking is again ignored, but the clock adjustment is calculated as $\Delta C = C_i(t_1) + \mu_{min} - C_j(t_2)$. In the Lamport case, this adjustment is added by $P_j$ to all further diagnostic events. In the case of complex interleave, the adjustment is added later, inside $P_0$ but before the simple interleave. In the end, the result is again the same.

Imagine now that $P_0$ observes the receive event before the send. In the Lamport case, all events from $P_j$ after the receive must wait inside the Simple Interleave queue until all events from other streams with earlier clocks are processed—including the send event from $P_i$. In the Complex Interleave case those events will wait for the send, but this time because the stream from is $P_j$ blocked. It will be understood that aspects can reuse the same queues for efficiency reasons.

In short, one can think of the blocking-unblocking operations as something that does not affect the order because the events after the receive have later (e.g., adjusted) clock values compared to the send. It is a particularly important to keep the events around until the necessary data to calculate the clock adjustment is collected.

At that point, one can conclude that since the result was the same before any message exchange, and remained the same after one exchange, it will stay the same after any number of sequentially exchanged messages. Similarly, it is possible to prove that the result is the same for concurrent message exchanges.

Referring back to physical time, it is interesting to observe what would be the actual clock values at the output of the above monitoring solutions, compared to the physical time.

Suppose that at the beginning only one process generates monitoring events, and there are no messages send or received, since no Lamport adjustments happened yet, the clock of the events is the same as the physical time of this single server. When another process joins in, the clock may abruptly change forward with a large value. This initialization problem is interesting, but not blocker for most everyday systems in which usually all events start with a single process (_main( . . . )) and other processes are activated by messages (e.g., services).

Even if all the clocks are synchronized at some point however, they will gradually drift apart, because of the clock speed difference. When messages are exchanged, some clocks will be reset forward so that the whole system keeps up with the fastest clock. There are at least three problems with this behavior:

1) The timestamps of the output events are shifted by some offset (e.g., different for each process) compared to the physical time;

2) The clock of all processes except the one with the fastest clock will jerk abruptly forward from time to time. The time interval measured between events shortly before and shortly after the reset might be infinitely larger than the actual difference of the occurrence times; and 3) The time intervals between the events will be wrong in general compared to the physical (e.g., observer) time—for example, time intervals between events in the process with the fastest clock will look longer than the difference of the occurrence times.

This behavior might be acceptable for some class of applications, but is apparently limited when physical processes are involved, for example, a network of meteorological stations trying to observe derivatives of the temperature and the atmospheric pressure, or a fleet of spaceships attempting to catalogue asteroid trajectories. It is particularly desirable to enhance the interleave transform so that the timestamps of the output events will represent the actual occurrence time as per the observer clock, with guaranteed precision.

Referring now to a discussion of absolute time transform, it is reasonable to assume as a first approximation that the local clocks are linear functions of time, e.g., the actual value of the P1 clock is $t^{P1}=a^{P1}t+b^{P1}$, where t is the physical (observer) time. If a and b are known, one could easily transform the event timestamps from P1 to the corresponding real (observer) time. Therefore, algorithmic techniques can be established that allow interference of a and b with certain precision from observations.

Thus far, discussion was only directed to one-directional communication between the event sources and the observer. Here, a requirement is discussed that requires that the observer to generate 'clock reference' messages that carry the observer clock and sends them to all event sources. When the event sources receive such message, they just log a special 'clock marker' monitoring event containing the observer-clock from the message as well as the local clock (e.g., receive event occurrence time). The result of this 'clock reference bounce' gives some idea of where the P1 clock is as illustrated in FIG. 11.

Figure 11:
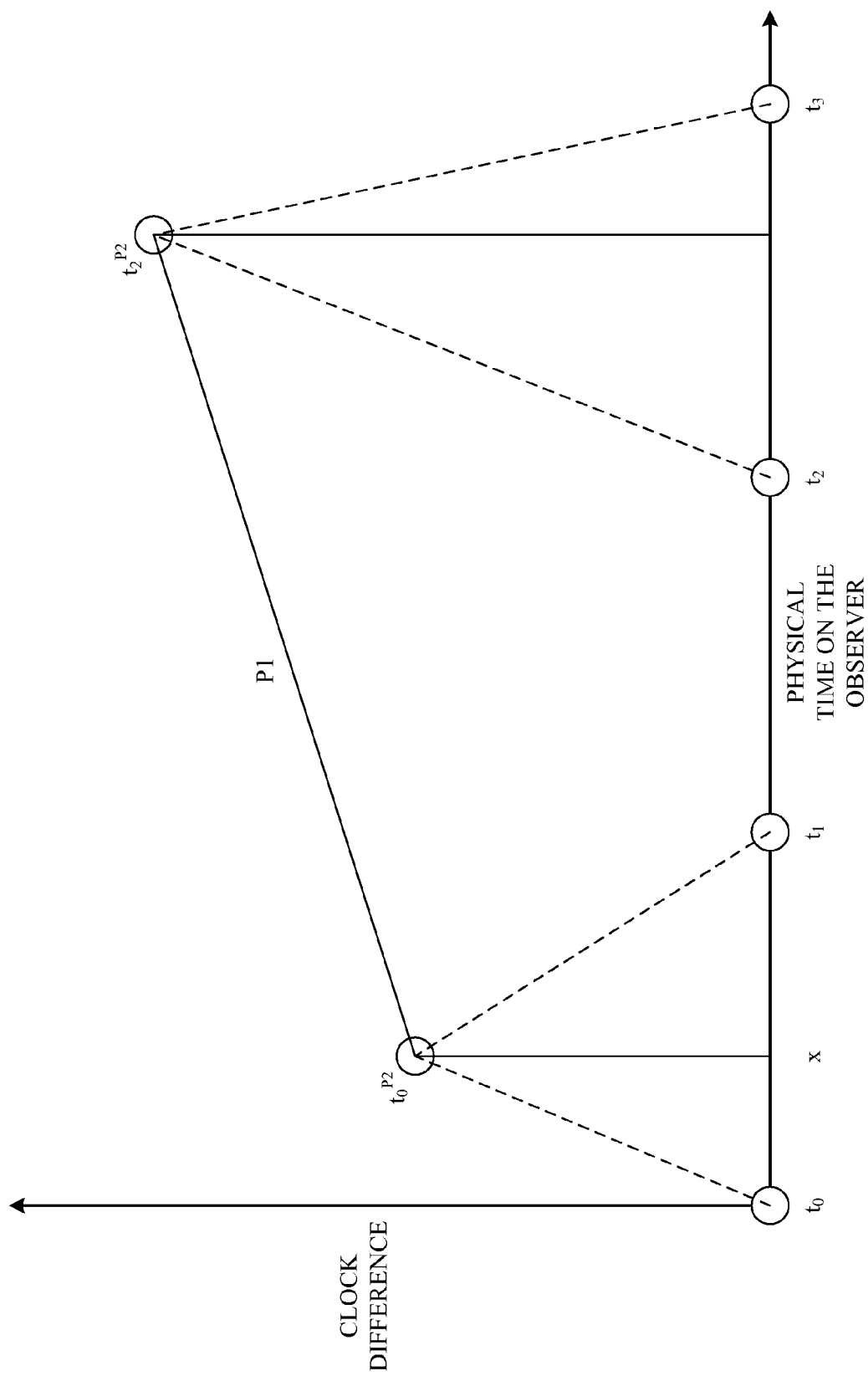
FIG. 11 illustrates an example of 'clock reference bounce' in accordance with an aspect of the innovation.
Figure 12:
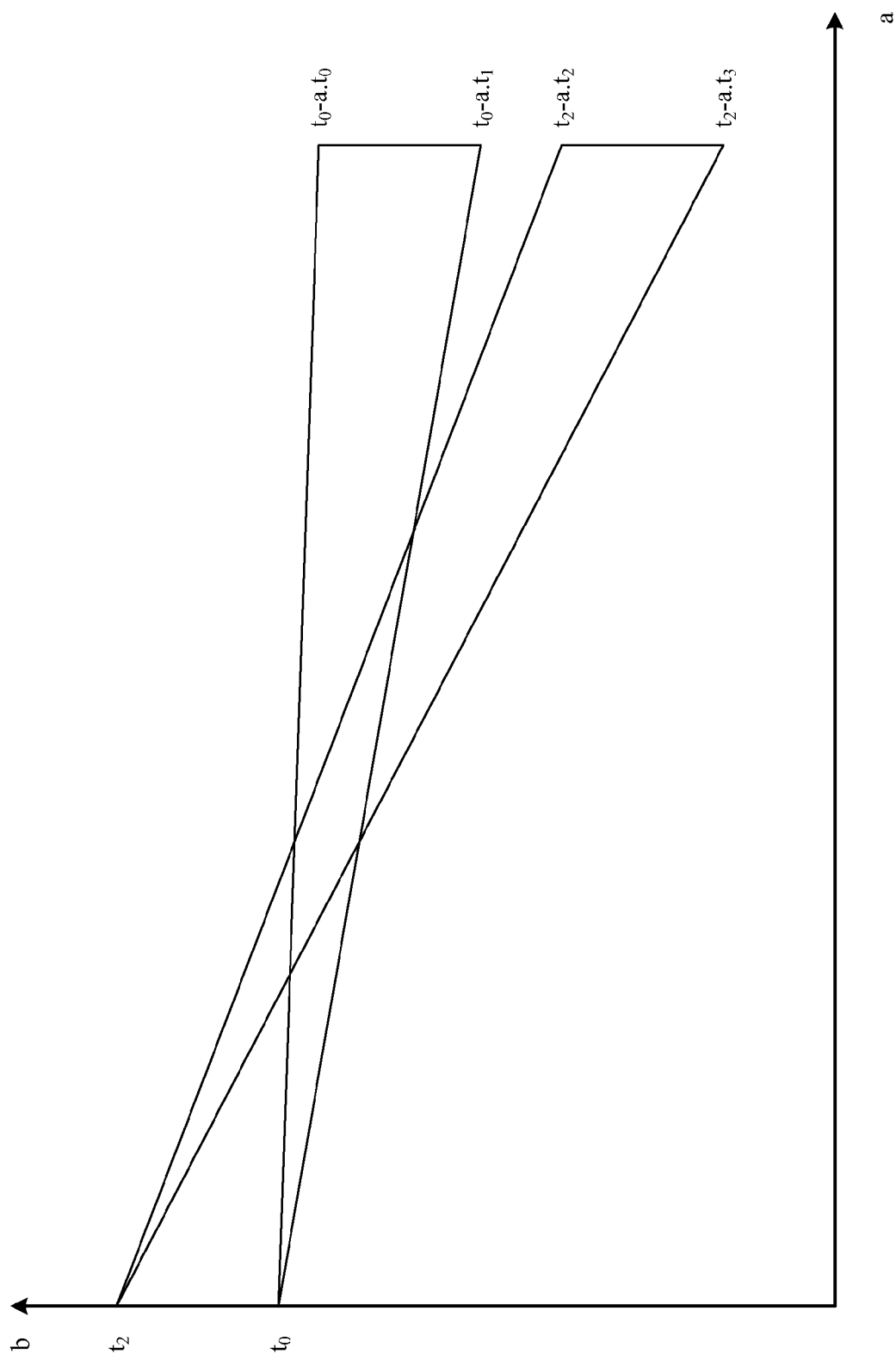
FIG. 12 illustrates a graphical expression of the result of a 'second bounce' in accordance with an aspect of the innovation.

As shown in FIG. 11, the horizontal axis represents physical (observer) time, and the vertical axis represents the difference in clocks. The observer sends a 'clock reference' message at time $t_0$, which is received by P1 at some unknown physical time x. Upon receipt, P1 logs a 'clock marker' containing $t_0$ and its local time $t_0^{P1}=a^{P1}x+b^{P1}$. By solving this equation for x, the result is obtained $$t_0 < \frac{t_0^{P1}-b^{P1}}{a^{P1}} < t_1$$

where $t_1$ is the time observer processes the clock marker event. Since $a^{P1}$ is a positive number (e.g., close to 1), the result obtained is: $t_0^{P1}-a^{P1}t_0>b^{P1}>t_0^{P1}-a^{P1}t_1$. Similarly, for the second bounce the result obtained is $t_2^{P1}-a^{P1}t_2>b^{P1}>t_2^{P1}-a^{P1}t_3$. Those expressions can be expressed graphically in FIG. 12.

Thus, it is not possible to exactly know a and b, but it is possible to have managed to limit their set of possible values. If the duration $t_2-t_0$ is much larger than the latencies, one can obtain a and b with arbitrary precision. This is practically not useful however, because it is desirable for the transform to work with minimum latency.

Imagine now that process P1 sends a message at physical time $t_{send}$ which is the received by P2 at $t_{recv}>t_{send}$. Again, the values for $t_{send}$ and $t_{recv}$ are not known, but one can express them from the corresponding local times $t_{send}^{P1}$ and $t_{recv}^{P2}$. This way one can obtain another restriction for a and b, which is now across processes:

$$\frac{t_{send}^{P1}-b^{P1}}{a^{P1}} < \frac{t_{send}^{P2}-b^{P2}}{a^{P2}},$$

which can also be written as $a^{P2}t_{send}^{P1}-b^{P1}<a^{P1}t_{send}^{P2}-b^{P2}$.

One can therefore think of finding the correct $\vec{a}$ and $\vec{b}$ as an attempt to shoot a straight line through a series of key holes. Such solution exist, because the events have happened in reality and in the correct order—it is just that the $\vec{a}$ and $\vec{b}$ or the latencies in each message exchange are not known. Unfortunately, shooting the correct straight line requires all the keyholes to be known, which requires the event streams to end, and then to process all the data. Back to the problem with the clocks, there will be differences in reconstructed time after $\vec{a}$ and $\vec{b}$ are used to transform events to the observer clock versus actual occurrence time.

Other aspects of the innovation can employ an artificial intelligence (AI) and/or machine learning & reasoning (MLR) component (not shown) which facilitates automating one or more features in accordance with the subject innovation.

The subject innovation (e.g., in connection with selection, clock alignment) can employ various AI-based schemes for carrying out various aspects thereof. For example, a process for determining which streams should be buffered and which should be immediately passed to the output can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when/if a stream should be buffered, when/if a stream should be passed to the output, how establish the logical clock, etc.

Figure 13:
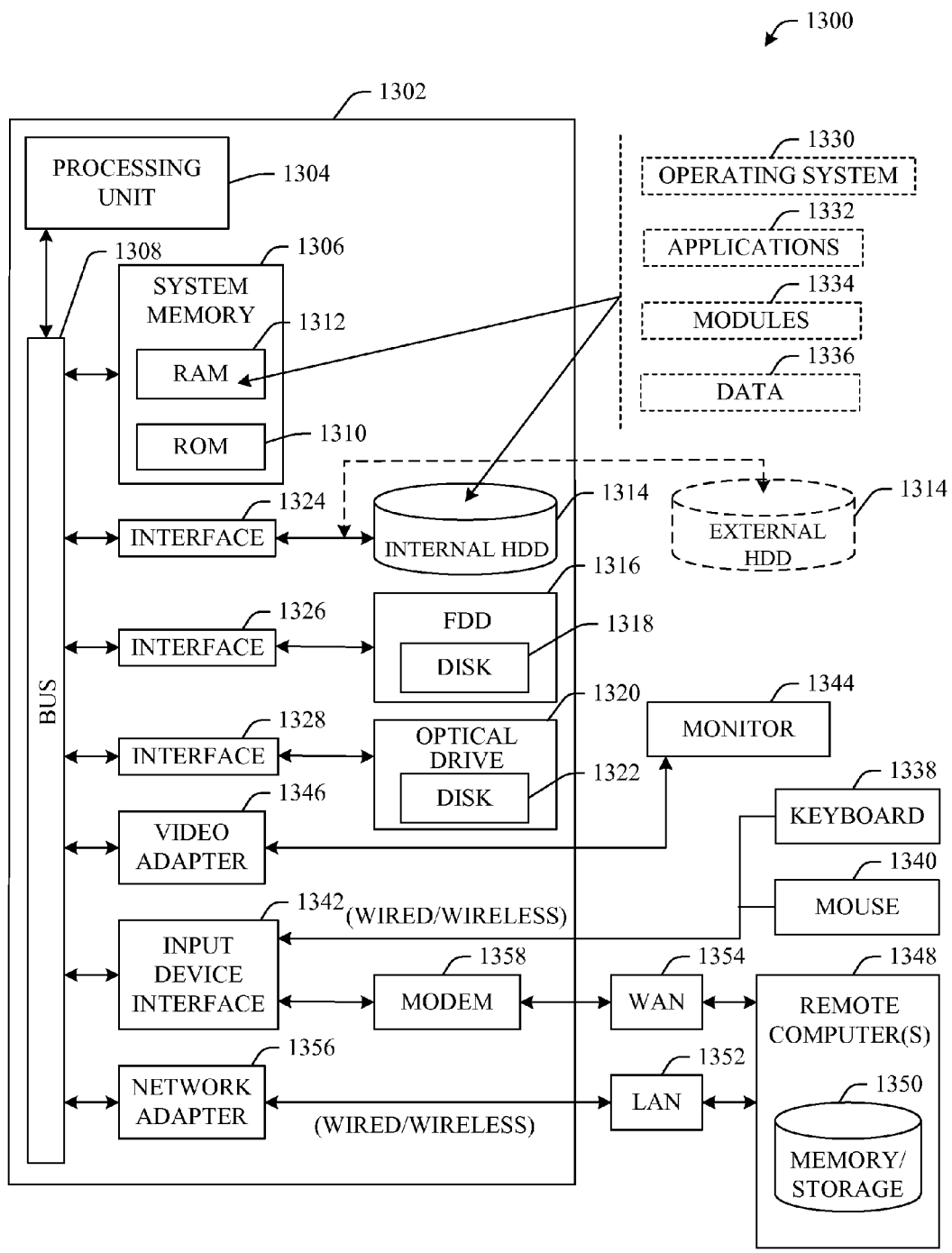
FIG. 13 illustrates a block diagram of a computer operable to execute the disclosed architecture.

Referring now to FIG. 13, there is illustrated a block diagram of a computer operable to execute the disclosed architecture of conditioning event streams. In order to provide additional context for various aspects of the subject innovation, FIG. 13 and the following discussion are intended to provide a brief, general description of a suitable computing environment 1300 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the innovation includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
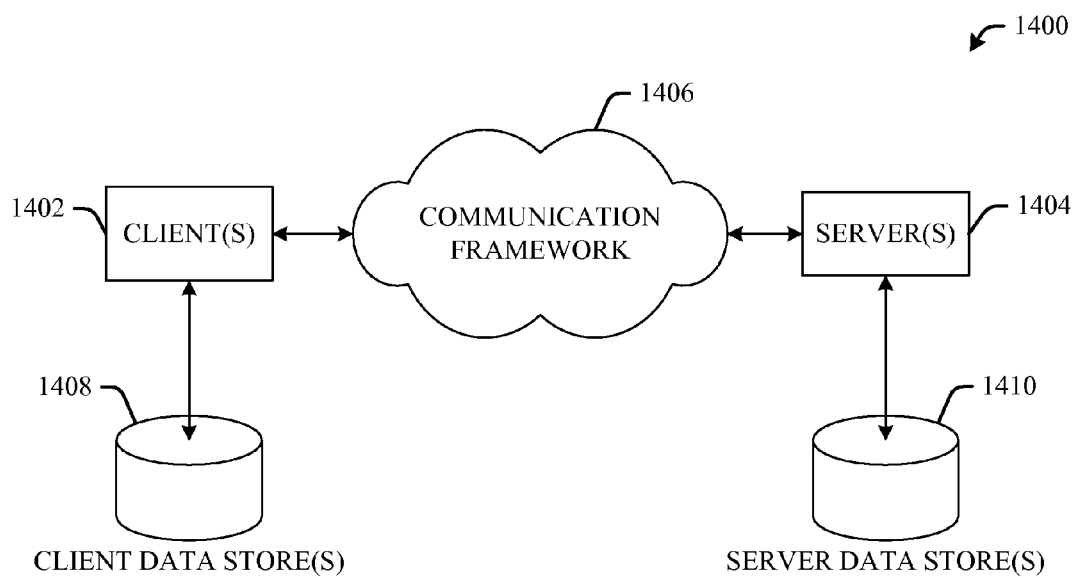
FIG. 14 illustrates a schematic block diagram of an exemplary computing environment in accordance with the subject innovation.

Referring now to FIG. 14, there is illustrated a schematic block diagram of an exemplary computing environment 1400 in accordance with the subject innovation. The system 1400 includes one or more client(s) 1402. The client(s) 1402 can be hardware and/or software (e.g., threads, processes, computing devices). The client(s) 1402 can house cookie(s) and/or associated contextual information by employing the innovation, for example.

The system 1400 also includes one or more server(s) 1404. The server(s) 1404 can also be hardware and/or software (e.g., threads, processes, computing devices). The servers 1404 can house threads to perform transformations by employing the innovation, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates event stream management, comprising:
   a processing unit;
   a system memory, coupled to the processing unit, storing system-executable instructions;
   an interface component operated by the processing unit, that receives physical clock information from a plurality of sources, the physical clock information being associated with a plurality of event streams received from the plurality of sources; and
   an event stream conditioning component operated by the processing unit that analyzes the physical clock information received from the plurality of sources, identifies physical clock misalignment, and correlates the physical clock information to establish a logical clock component representing a time relative to each of the plurality of sources, the event stream conditioning component including:
      a stream analyzer component that evaluates punctuation messages associated with the plurality of event streams to establish the logical clock component;
      an ordering component that:
         utilizes the logical clock component to introduce a bookmark for each event stream, the bookmark being equal to an occurrence in time when the last event for each event stream is received;

determines an output bookmark representing a minimum bookmark of the bookmarks introduced for each event stream; and arranges the plurality of event streams received from the plurality of sources for output based at least upon the output bookmark; and a buffer component that queues events for each of the plurality of arranged event streams until the events are equal to or less than the output bookmark.

2. The system of claim 1, wherein each of the plurality of sources comprises a physical clock component that provides a portion of the physical clock information.

3. The system of claim 1, wherein the interface component queries the plurality of sources for the physical clock information.

4. The system of claim 1, wherein the plurality of event streams relate to a security system.

5. The system of claim 1, wherein the plurality of event streams relate to a financial business system.

6. The system of claim 1, further comprising an artificial intelligence (AI) component that employs at least one of a probabilistic and a statistical-based analysis inferring an action that a user desires to be automatically performed.

7. A computer-implemented method of conditioning event streams, comprising:

receiving a plurality of event streams from a plurality of sources and a plurality of punctuation messages associated with the plurality of event streams;

evaluating the plurality of punctuation messages associated with the plurality of event streams to identify clock misalignment of a plurality of clocks associated with the plurality of sources, respectively;

establishing a virtual clock relative to each of the plurality of sources based at least in part on the plurality of punctuation messages;

utilizing the virtual clock to introduce a bookmark for each event stream, the respective bookmarks being equal to an occurrence in time when the last event for each event stream is received;

determining an output bookmark representing a minimum bookmark of the respective bookmarks introduced;

time aligning the plurality of event streams based at least on the output bookmark; and buffering multiple events for each of the plurality of time aligned event streams until the multiple events are equal to or less than the output bookmark.

8. The computer-implemented method of claim 7, further comprising pinging each of the plurality of sources for the punctuation messages.

9. A computer-executable system that facilitates organization of event streams, comprising:

a processing unit;

a system memory, coupled to the processing unit, storing system-executable instructions;

computer-implemented means operated by the processing unit for buffering a plurality of event streams received from a plurality of disparate sources;

computer-implemented means operated by the processing unit for analyzing punctuation messages related to each of the plurality of event streams to identify clock misalignment of a plurality of physical clocks associated with the plurality of disparate sources, respectively;

computer-implemented means operated by the processing unit for establishing a logical clock relative to each of the physical clocks based at least on the analysis of the punctuation messages;

computer-implemented means operated by the processing unit for utilizing the logical clock to introduce a bookmark for each event stream, the respective bookmarks being equal to an occurrence in time when the last event for each event stream is received;

computer-implemented means operated by the processing unit for determining an output bookmark representing a minimum bookmark of the respective bookmarks introduced;

computer-implemented means operated by the processing unit for passing a subset of the plurality of event streams to an output based at least upon the output bookmark; and computer-implemented means operated by the processing unit for buffering multiple events for each of the subset of plurality of event streams until the multiple events are equal to or less than the output bookmark.

10. The system of claim 1, wherein the event stream conditioning component analyzes patterns and correlations of the plurality of event streams for a set period of time.

11. The system of claim 1, wherein the event stream conditioning component reconstructs the plurality of event streams such that a first event received in a first event stream, which is actually received after a second event received in a second event stream, is arranged for output before the second event based on the logical clock component and the output bookmark.

12. The computer-implemented method of claim 7, wherein time aligning the plurality of event streams further comprises reconstructing the plurality of event streams such that a first event received in a first event stream, which is actually received after a second event received in a second event stream, is output before the second event based on the virtual clock.

13. The computer-executable system of claim 9, wherein passing the subset of the plurality of event streams further comprises reconstructing the subset of the plurality of event streams such that a first event received in a first event stream, which is actually received after a second event received in a second event stream, is output before the second event based at least in part on the logical clock.

14. The system of claim 1, wherein the output bookmark is reset when the ordering component determines a new minimum bookmark.

15. The computer-implemented method of claim 7, further comprising:

outputting the multiple events when they are equal to or less than the output bookmark.

16. The computer-implemented method of claim 15, further comprising resetting the output bookmark in association with a more recent minimum bookmark.

17. The computer-executable system of claim 9, wherein the output bookmark is reset in association with an updated minimum bookmark.

* * * * *